(12) United States Patent
Griswold

(10) Patent No.: US 9,450,869 B2
(45) Date of Patent: Sep. 20, 2016

(54) SYSTEM AND METHOD FOR A FLEXIBLE NUMBER OF LOOKUPS IN PIPELINE-BASED PACKET PROCESSORS

(71) Applicant: Broadcom Corporation, Irvine, CA (US)

(72) Inventor: Mark David Griswold, Fremont, CA (US)

(73) Assignee: BROADCOM CORPORATION, Irvine, CA (US)

( * ) Notice: Subject to any disclaimer, the term of this patent is extended or adjusted under 35 U.S.C. 154(b) by 271 days.

(21) Appl. No.: 14/133,789

(22) Filed: Dec. 19, 2013

(65) Prior Publication Data

US 2015/0110110 A1    Apr. 23, 2015

Related U.S. Application Data

(60) Provisional application No. 61/893,962, filed on Oct. 22, 2013.

(51) Int. Cl.
*H04L 12/851*    (2013.01)
*H04L 12/741*    (2013.01)

(52) U.S. Cl.
CPC .................. *H04L 45/745* (2013.01)

(58) Field of Classification Search
CPC ........... H04L 49/3063; H04L 49/1546; H04L 47/2441; H04L 12/5693
See application file for complete search history.

(56) References Cited

U.S. PATENT DOCUMENTS 6,704,794 B1 *   3/2004   Kejriwal ................. H04L 29/06
                                                      370/392
2014/0334489 A1 * 11/2014  Bosshart ............... H04L 45/745
                                                      370/392

* cited by examiner

*Primary Examiner* — Fan Ng
(74) *Attorney, Agent, or Firm* — Foley & Lardner LLP; Joseph N. Ziebert; Angela D. Murch

(57) ABSTRACT

A system and method for a flexible number of lookups in pipeline-based packet processors. Pipeline-based packet processors can be configured to allow multiple lookups per physical table. In one embodiment, a start of packet (SOP) cell is assigned to a first slot of a packet processing pipeline, and a non-SOP cell is assigned to a second slot of a packet processing pipeline. Access of a table by the second slot can be usurped by the SOP cell in the first slot.

20 Claims, 9 Drawing Sheets

SYSTEM AND METHOD FOR A FLEXIBLE NUMBER OF LOOKUPS IN PIPELINE-BASED PACKET PROCESSORS

This application claims priority to provisional application No. 61/893,962, filed Oct. 22, 2013, which is incorporated herein by reference in its entirety.

BACKGROUND

1. Field of the Invention

The present invention relates generally to pipelined information processing and, more particularly, to a system and method for a flexible number of lookups in pipeline-based packet processors.

2. Introduction

Increasing demands are being placed upon the data communications infrastructure. These increasing demands are driven by various factors, including the increasing bandwidth requirements of Internet multimedia applications (e.g., distribution of news, financial data, software, video, audio and multi-person conferencing, etc). To accommodate the increasing bandwidth requirements, communication link speeds have also continued to evolve. For example, 10 Gigabit Ethernet (GbE) ports are commonly used for I/O on many of today's network switches.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Pipeline-based packet processors can be configured to allow multiple lookups per physical table. In one embodiment of the present invention, a method is provided that includes assigning a start of packet (SOP) cell to a first slot of a packet processing pipeline; accessing a table using first information associated with the SOP cell when the first slot of the packet processing pipeline advances to stage i; and accessing the table using second information associated with the SOP cell when the first slot of the packet processing pipeline subsequently advances to stage j, wherein the access of the table when the SOP cell advances to stage j usurps an access by a second slot, which follows the first slot, when the second slot advances to stage i.

In another embodiment, a packet processing system is provided that includes a buffer that is configured to store cells prior to entry into a packet processing pipeline; a table that is configured for access using information associated with a start of packet (SOP) cell; and a scheduler that is configured to select an SOP cell from the buffer and to assign the SOP cell to a first slot of the packet processing pipeline, wherein the table is accessed using first information associated with the SOP cell when the first slot of the packet processing pipeline advances to stage i, and the table is accessed using second information associated with the SOP cell when the first slot of the packet processing pipeline subsequently advances to stage j, wherein the access of the table when the SOP cell advances to stage j usurps an access of the table by a second slot, which follows the first slot, when the second slot advances to stage i.

Figure 1:
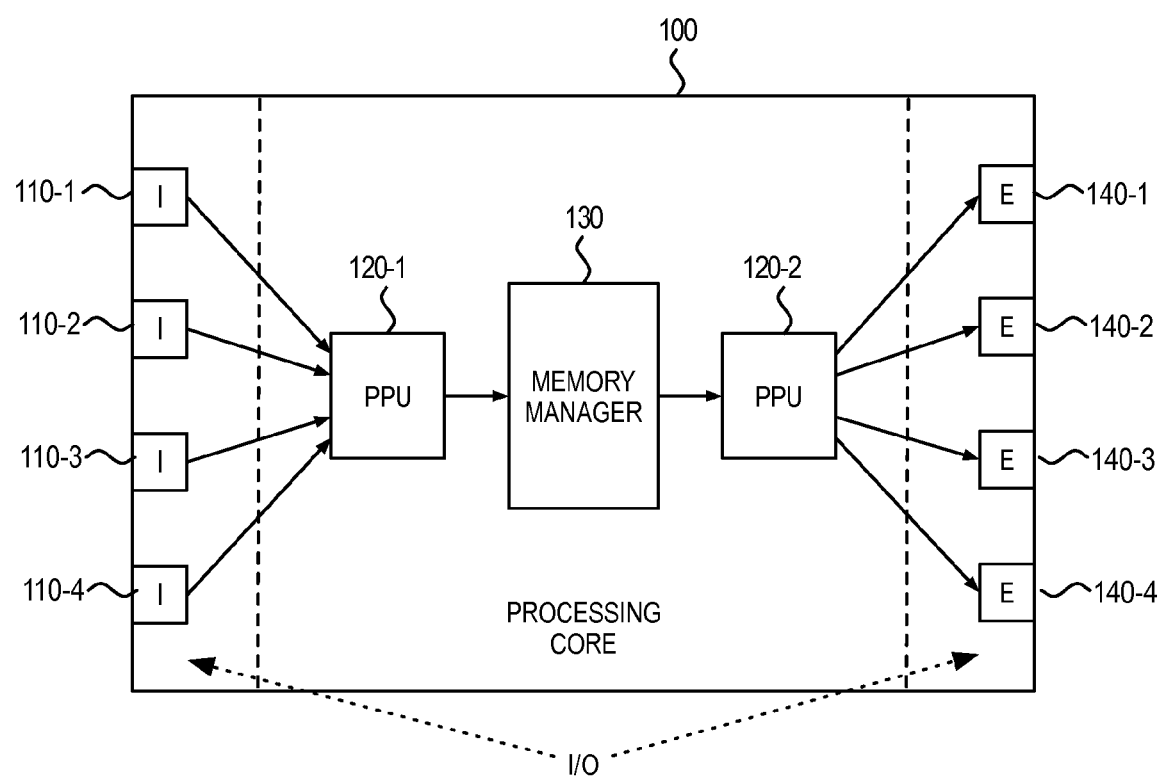
FIG. 1 illustrates an example embodiment of a packet processing system.

FIG. 1 illustrates an example embodiment of a packet processing system (e.g., switch, router, etc.) that incorporates features of the present invention. As illustrated, packet processing system 100 includes a plurality of ingress ports 110-1 to 110-4, each of which can provide connectivity to other network devices. As an example, each of ingress ports 110-1 to 110-4 can provide 10 GbE connectivity to other packet processing systems (e.g., top-of-rack (TOR) switch) in a data center. Similarly, packet processing system 100 includes a plurality of egress ports 140-1 to 140-4, each of which can provide connectivity to other network devices. As would be appreciated, the illustration of ingress ports 110-1 to 110-4 and egress ports 140-1 to 140-4 is an unfolded view of a packet processing system.

In general, ingress ports 110-1 to 110-4 and egress ports 140-1 to 140-4 are included as part of the I/O portion of packet processing system 100. The I/O portion of packet processing system 100 is shown as being logically distinct from the processing core of packet processing system 100. In one embodiment, the processing core of packet processing system 100 includes packet processing units 120-1, 120-2 and memory manager unit 130. In one embodiment, memory manager unit 130 employs a packet buffer based on an array of banked shared memories.

In one embodiment, packet processing units 120-1, 120-2 of the present invention execute real-time operations on packets, such as framing/parsing, classification, traffic policing and shaping, modification, compression/encryption, queuing, etc. Control operations such as translation, route calculation, routing table updates, etc. can also be performed by packet processing units 120-1, 120-2. As would be appreciated, the specific configuration of the processing core of packet processing system 100 is implementation dependent.

Figure 2:
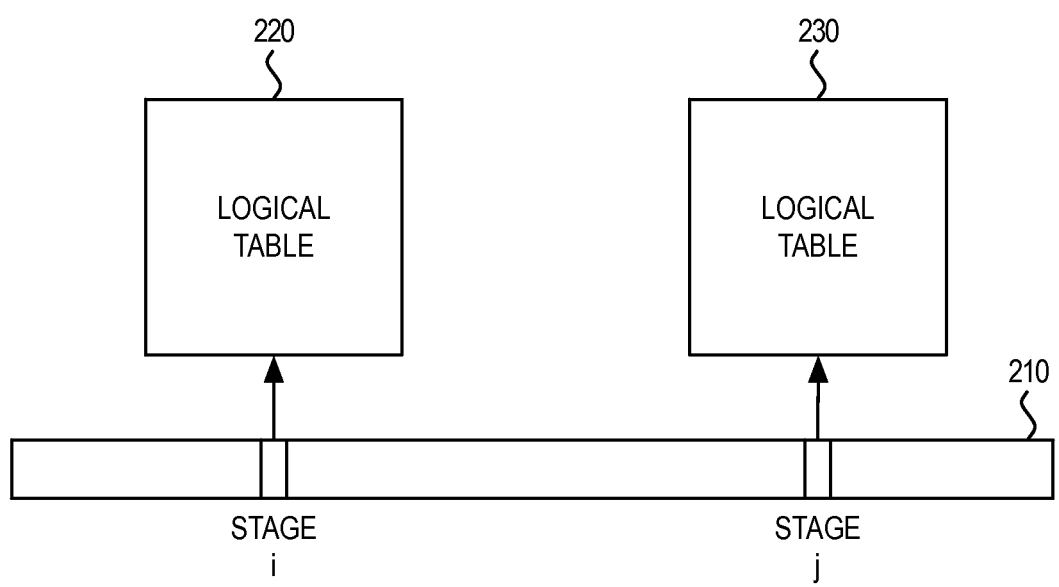
FIG. 2 illustrates an example of a table lookup by a packet processing pipeline.

FIG. 2 illustrates an example of a packet processing pipeline that can be implemented by a packet processing unit. As illustrated, packet processing pipeline 210 includes a plurality of tables 220, 230 that can be accessed using information associated with a cell when that cell enters a particular stage of packet processing pipeline 210. For example, when a cell enters stage "i" of packet processing pipeline 210, then logical table 220 is accessed, and when a cell enters stage "j" of packet processing pipeline 219, then logical table 230 is accessed. This example illustrates logical tables that do not support multiple lookups.

In the present invention, it is recognized that it is desired for packet processor systems to have the flexibility to allow multiple lookups per physical table. For example, if support for multiple lookups per physical table is not available, then applications that require two lookups (e.g. L2, unicast reverse path forwarding (uRPF), etc.) into the same large database would necessitate either a duplication of the database or the use of a multi-ported database implementation. Significant cost penalties can be incurred through such solutions. Further, if support for multiple lookups per physical table is not available, then logical and physical table sizes would be identical. The tables would therefore be fixed by the hardware design and would not be configurable. Still further, if support for multiple lookups per physical table is not available, then the benefit of flexible packet processing (e.g., flexible key generation) would be limited.

Figure 3:
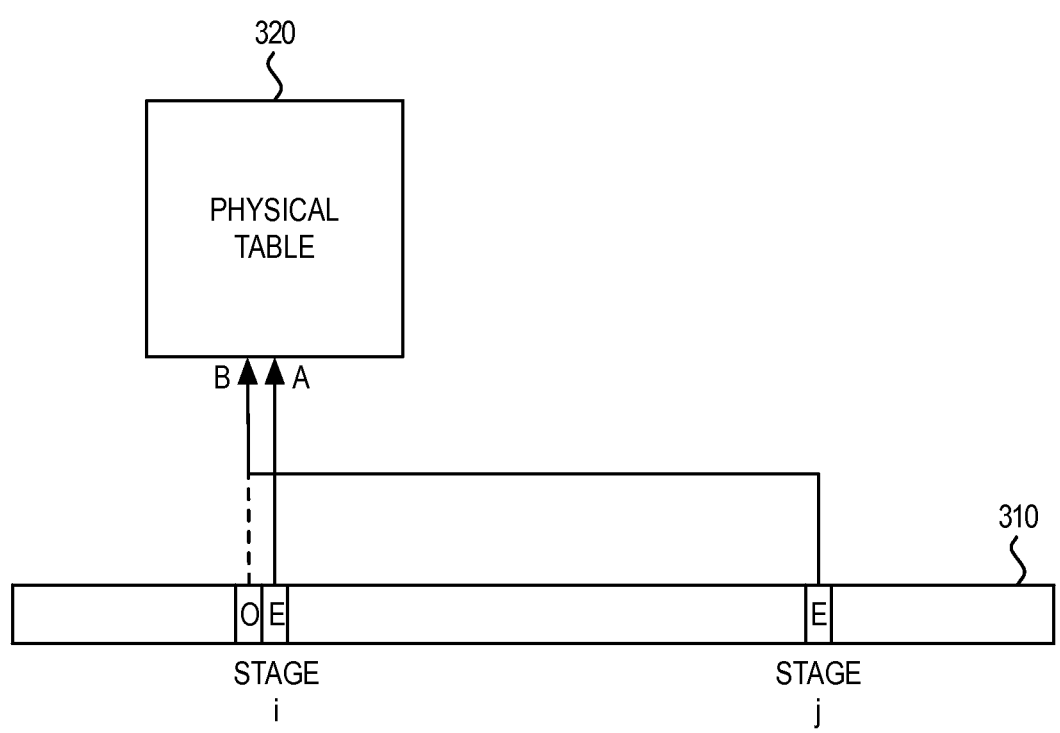
FIGS. 3, 4 and 7 illustrate examples of multiple table lookups by a packet processing pipeline.

It is therefore a feature of the present invention that a configurable number of accesses (e.g., read/lookup or write/learn) can be defined for a packet processing system. FIG. 3 illustrates an example of multiple table lookups by a packet processing pipeline. For simplicity only a single physical table 320 is illustrated for access by packet processing pipeline 310.

As illustrated, access to physical table 320 occurs at a particular stage "i" of packet processing pipeline 310. In this framework, it is recognized that a scheduler can apportion slots in packet processing pipeline 310 based on defined types in accordance with a conflict-free policy. For example, an even/odd slotting system can be used to signify cells of two different defined types. In one embodiment, the even slots can be used for assignment of any type of cells, including cells that are of a Start-Of-Packet (SOP) type, while odd slots can be used for assignment of cells that are of a SOP disallowed type, including cells such as Middle-Of-Packet (MOP) and End-Of-Packet (EOP) cells. It should further be noted that the odd slots of a SOP disallowed type could be an invalid slot that does not contain a valid cell. This could occur, for example, where the scheduler may not have a valid non-SOP cell to fill an SOP-disallowed slot. In that scenario, the scheduler would schedule an invalid slot. In this example, even/odd slotting system, SOP cells can be assigned to even slots, and SOP cells would be disallowed from assignment to odd slots.

To illustrate the usage of such even/odd slots, consider an example where physical table 320 is only accessed by SOP cells. When an even slot reaches stage "i" of packet processing pipeline 310, then the SOP cell contained within the even slot would access physical table 320. When the even slot subsequently advances to stage "j" of packet processing pipeline 310, physical table 320 could again be accessed by the SOP cell. This access by the SOP cell in stage "j" of packet processing pipeline 310 would effectively usurp access to physical table 320 by an odd slot, which cannot contain an SOP cell, when the odd slot enters stage "i" of packet processing pipeline 310. As the odd slot entering stage "i" of packet processing pipeline 310 would not need access to physical table 320, access by the SOP cell at stage "j" of packet processing pipeline 310 would be permitted without access conflict.

As this example illustrates, SOP cells can have access to physical table 320 in sequence A, B. In one embodiment, multiple logical tables (e.g., A and B) can be combined into a single physical table. Access A would occur when the even slot enters stage "i" of packet processing pipeline 310, while Access B would occur when the even slot subsequently enters stage "j" of packet processing pipeline 310. Instead of an odd slot accessing physical table 320 when the odd slot enters stage "i" of packet processing pipeline 310, the even slot at stage "j" of packet processing pipeline 310 would access physical table 320. In other words, stage "j" would usurp the access of physical table 320 when the odd slot moves to stage "i" of packet processing pipeline 310.

Figure 4:
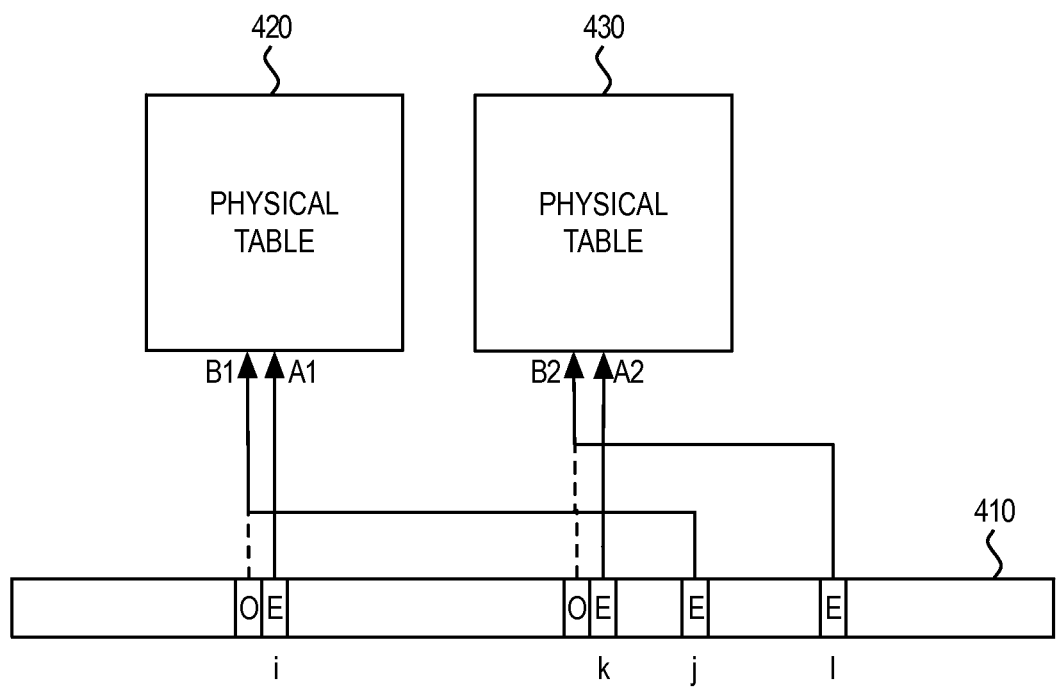

FIG. 4 illustrates another example of multiple table lookups by a packet processing pipeline. In this example, packet process pipeline 410 is shown accessing physical table 420 and physical table 430. Both physical table 420 and physical table 430 can only be accessed by SOP cells.

As illustrated, even slots have been defined at stages "i", "k", "j" and "l" of packet processing pipeline 410. As this example illustrates, an SOP cell can have access to physical table 420 in sequence A1, B1. Access A1 would occur when the even slot enters stage "i" of packet processing pipeline 410, while access B1 would occur when the same even slot subsequently enters stage "j" of packet processing pipeline 410. Instead of the odd slot accessing physical table 420 when the odd slot enters stage "i" of packet processing pipeline 410, the even slot at stage "j" of packet processing pipeline 410 would access physical table 420. In other words, stage "j" would usurp the access of physical table 420 when the odd slot moves to stage "i" of packet processing pipeline 410.

Similarly, an SOP cell can have access to physical table 430 in sequence A2, B2. Access A2 would occur when the even slot enters stage "k" of packet processing pipeline 410, while access B2 would occur when the same even slot subsequently enters stage "l" of packet processing pipeline 410. Instead of the odd slot accessing physical table 430 when the odd slot enters stage "k" of packet processing pipeline 410, the even slot at stage "l" would access physical table 430. In other words, stage "l" would usurp the access of physical table 430 when the odd slot moves to stage "k" of packet processing pipeline 410.

Here, it should be noted that the latency between stages that access physical table 420 can be different to the latency between stages that access physical table 430. In other words, the distance between stage "j" and "i" of packet processing pipeline 410 and the distance between stage "l" and stage "k" of packet processing pipeline 410 can vary and need not be the same length. As would be appreciated, the number of physical tables that are accessed by packet processing pipeline 410 would be implementation dependent.

Figure 5:
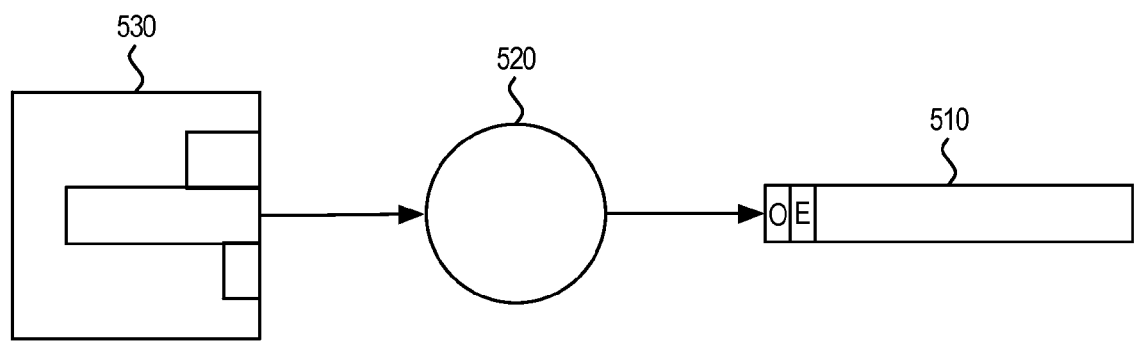
FIGS. 5, 6 and 8 illustrate example operations of a scheduler according to the present invention.

FIG. 5 illustrate the example operations of a scheduler according to the present invention. As illustrated, scheduler 520 is configured to apportion slots of packet processing pipeline 510 in accordance with a conflict-free policy. In the example packet processing pipeline 510, the conflict-free policy is based on alternating even and odd slots as defined in the context of the examples of FIGS. 3 and 4.

Cells that are to be loaded into packet processing pipeline 510 are selected from oversubscription absorption buffer 530. In general, oversubscription absorption buffer 530 is configured to hold cells per port, until the cells are selected by scheduler 520 to enter packet processing pipeline 510. As part of this process, oversubscription absorption buffer 530 can be configured to notify scheduler 520 of the next cell type (e.g., SOP cell vs. non-SOP cell) for each port. In one embodiment, oversubscription absorption buffer 530 can also be configured to implement flow control of the source port to ensure that packet loss is avoided when the aggregate input bandwidth exceeds the processing rate of the packet processing unit.

Based on the apportioning of slots in accordance with an implemented conflict-free policy, scheduler 520 would then be configured to assign cells held in oversubscription absorption buffer 530 into the restricted slots in packet processing pipeline 510. Consider, for example, the usage of alternating even and odd slots. In this example, scheduler 520 would select only SOP cells from oversubscription absorption buffer 530 for assignment into even slots of packet processing pipeline 510, and would select only non-SOP cells from oversubscription absorption buffer 530 for assignment into odd slots of packet processing pipeline 510.

In this process, the choice of cells from oversubscription absorption buffer 530 that scheduler 520 would select for assignment into a designated slot of packet processing pipeline 510 would be dependent on the defined type of that designated slot. In other words, the slot type can effectively operate to mask port requests to scheduler 520. It should be noted that even and odd slots would not necessarily be assigned to the same port. It should also be noted that scheduler 520 can be configured to perform the selection process to fill the designated slots of packet processing pipeline 510 in accordance with bandwidth fairness considerations for the various ports.

Figure 6:
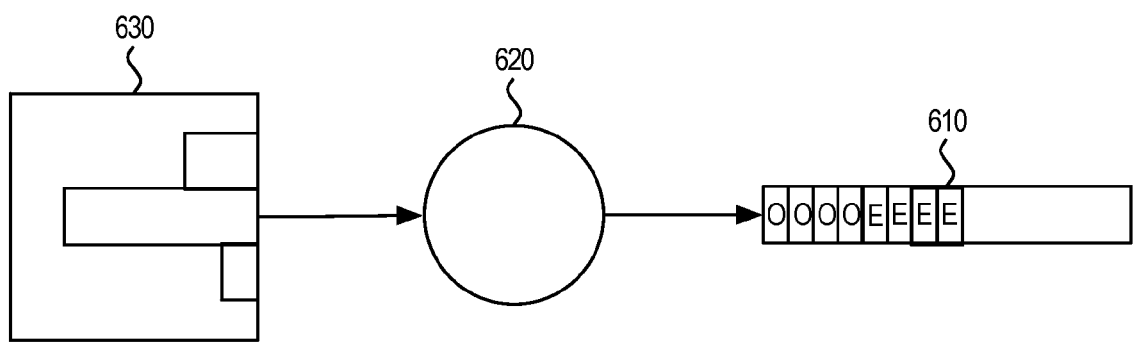

In operation, a packet process pipeline or downstream component can have hazards (e.g., read after write hazard). FIG. 6 illustrates an example embodiment of an assignment mechanism that can address such hazards in allowing contention-free access to databases. As illustrated, scheduler 620 selects cells from oversubscription absorption buffer 630 for assignment into slots of packet processing pipeline 610. As illustrated, a repeating pattern of eight slots is produced through the specification of a group of four even slots followed by a group of four odd slots. By this repeating pattern, a minimum of four cycles spacing would be provided between cells of the same packet. In general, with this slot-type assignment, stages that access databases would be an odd multiple of four cycles apart (i.e., $4(2k+1)$ cycles for some k). As would be appreciated, the particular repeating pattern of slots (e.g., even/odd) would be implementation dependent depending on the particular type and characteristics of hazards in the system.

It should be noted that the slot assignment example of FIG. 6 would increase jitter for certain line-rate spacings (e.g., 1-in-5), which would increase latency (e.g., by at most three cycles). Such an increase in jitter and corresponding latency would be a relative cost of the multiple-lookup benefit achieved.

Figure 7:
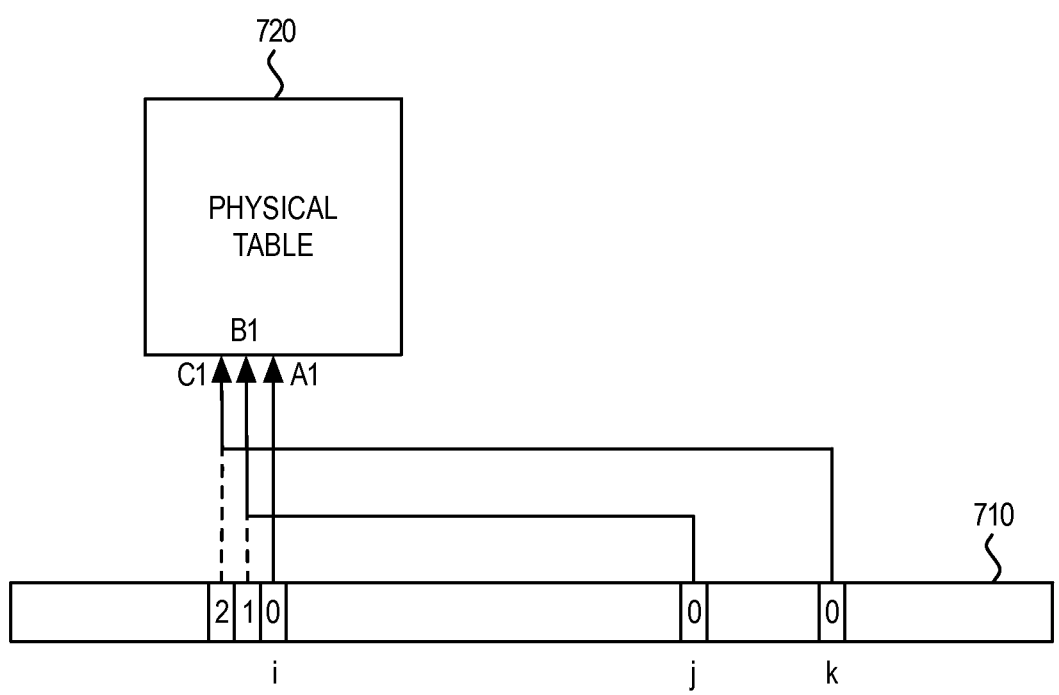

FIG. 7 illustrates another example of multiple table lookups by a packet processing pipeline. In this example, packet process pipeline 710 is shown accessing physical table 720, which can only be accessed by SOP cells. In one example, physical table 720 implements logical tables A, B, and C.

As illustrated, three slots are designated as Mod-0, Mod-1 and Mod-2 slots, respectively. Here, Mod-0 slots are designated as SOP slots that can be used for any cells including those of an SOP type, while Mod-1 and Mod-2 slots are designated as SOP disallowed slots that can be used for assignment of cells that are of a non-SOP type or for invalid slots. By this assignment mechanism, a first access (A1) to physical table 720 can occur when Mod-0 slot enters stage "i" of packet process pipeline 710, a second access (B1) to physical table 720 can occur when Mod-0 slot at stage "j" usurps the access of the Mod-1 slot when it enters stage "i" of packet process pipeline 710, and a third access (C1) to physical table 720 can occur when Mod-0 slot at stage "k" usurps the access of the Mod-2 slot when it enters stage "i" of packet process pipeline 710. As this example illustrates, SOP cells can have access to physical table 720 in sequence A1, B1, C1. As would be appreciated the Mod-0, Mod-1 and Mod-2 slot assignments need not be strictly consecutive in packet processing pipeline 710.

Figure 8:
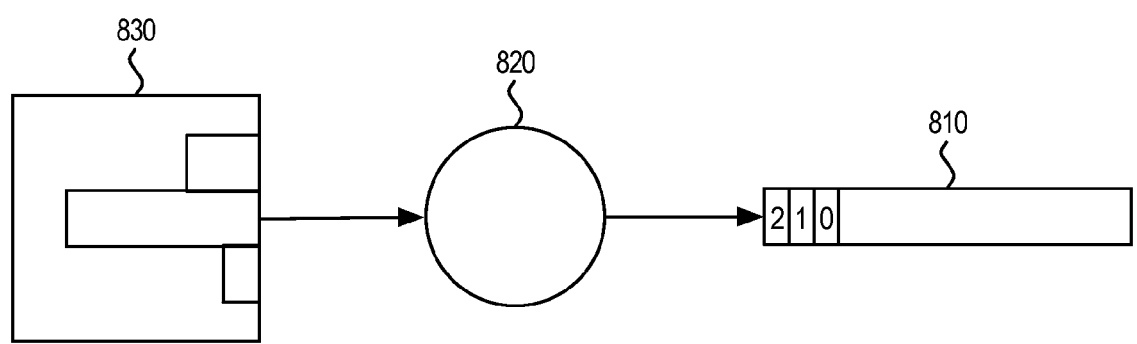

FIG. 8 illustrate the example operations of a scheduler to facilitate the assignment of cells in the example of FIG. 7. As illustrated, scheduler 820 is configured to assign cells from oversubscription absorption buffer 830 to apportioned slots of packet processing pipeline 810 in accordance with a conflict-free policy. In the example of packet processing pipeline 810, the conflict-free policy is based on Mod-0, Mod-1 and Mod-2 slots as defined in the context of the example of FIG. 7. Here, scheduler 820 would ensure that SOP cells are assigned to designated Mod-0 slots, while only non-SOP cells or no valid cells are assigned to designated Mod-1 or Mod-2 slots. Again, it should be noted that Mod-0, Mod-1 and Mod-2 slots are not necessarily assigned to the same port.

Figure 9:
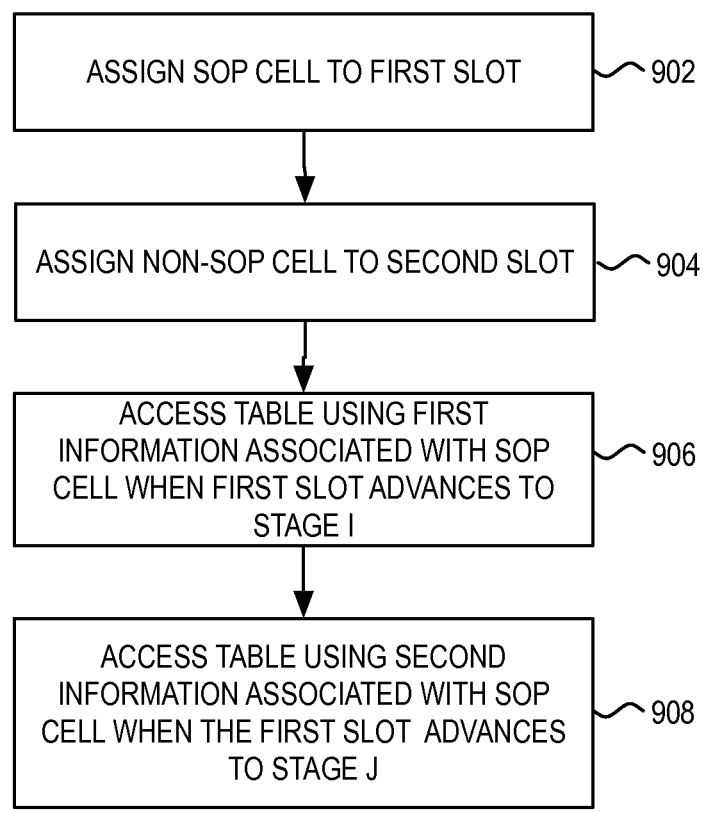
FIG. 9 illustrates a flowchart of a process of the present invention.

Having described a general framework for assignment of cells to a packet processing pipeline in accordance with a conflict-free policy, reference is now made to FIG. 9, which illustrates an example process of the present invention.

As illustrated, the process begins at step 902, where a scheduler assigns an SOP cell to a first slot of a packet processing pipeline. In one example, the first slot can receive cells of any type. In selecting cells from an oversubscription absorption buffer for the first slot, the scheduler can choose to select SOP cells for assignment to the first slot.

Next, at step 904, the scheduler assigns a non-SOP cell to a second slot of the packet processing pipeline. In one example, the second slot can be defined to be an SOP-disallowed slot that can receive an assignment of only non-SOP cells or no assignment of valid cells. In selecting cells from the oversubscription absorption buffer for the second slot, the scheduler is therefore configured to select from only those cells (i.e., non-SOP cells) that meet the defined type. As noted, if there is no valid cell for the scheduler to assign to the second slot, the second slot can be an invalid slot that does not contain a valid cell.

Next, at step 906, a table is accessed using first information associated with the SOP cell when the first slot advanced to stage "i" of the packet processing pipeline. In one embodiment, the table is a packet processing database that is only accessed by SOP cells. Finally, at step 908, the table is accessed using second information associated with the SOP cell when the first slot advances to stage "j" of the packet processing pipeline. By this process, the first slot of the packet processing pipeline usurps the access of the table by the second slot, when the second slot enters stage "i" of the packet processing pipeline.

In one embodiment, the above process of the present invention is implemented by an ingress packet processing pipeline. In another embodiment, the above process of the present invention is implemented by an egress packet processing pipeline. In this embodiment, the oversubscription absorption buffer would be performed by a memory manager unit.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
assigning, using a scheduler of a packet processing system, a start of packet (SOP) cell to a first slot of a packet processing pipeline in a packet processing unit of the packet processing system;
accessing, using the packet processing unit, a table from a memory of the packet processing system using first information associated with the SOP cell when the SOP cell advances to a stage i; and
accessing the table using second information associated with the SOP cell when the SOP cell subsequently advances to a stage j, wherein the access of the table when the SOP cell advances to the stage j usurps an access of the table relating to a cell assigned to a second slot of the packet processing pipeline advancing to the stage i.

2. The method of claim 1, further comprising assigning a non-SOP cell to the second slot.

3. The method of claim 1, wherein the second slot does not contain a valid cell.

4. The method of claim 1, further comprising:
accessing using the packet processing unit the table using third information associated with the SOP cell when the SOP cell subsequently advances to a stage k, wherein access of the table when the SOP cell advances to the stage k usurps an access of the table relating to a non-SOP cell assigned to a third slot advancing to the stage i.

5. The method of claim 1, wherein the packet processing pipeline is an ingress pipeline.

6. The method of claim 1, wherein the packet processing pipeline is an egress pipeline.

7. The method of claim 1, wherein the packet processing system is one of a switch or a router in a network, and the packet processing system comprises a plurality of ingress ports, further comprising filling an oversubscription absorption buffer with cells received from the ingress ports, and the scheduler selecting cells from the oversubscription absorption buffer to assign to the packet processing pipeline.

8. The method of claim 7, wherein the packet processing pipeline includes even slots including the first slot and odd slots including the second slot, SOP cells are assigned to even slots and non-SOP cells are assigned to odd slots, and the scheduler apportions lots of the packet processing pipeline in accordance with a conflict-free policy based on alternating even and odd slots.

9. A packet processing system, comprising:
a first memory comprising a buffer configured to store cells prior to entry into a packet processing pipeline;
a second memory comprising a table that is configured for access using information associated with a start of packet (SOP) cell; and
a processor core comprising a scheduler configured to select an SOP cell from the buffer and to assign the SOP cell to a first slot of the packet processing pipeline,
wherein the table is accessed using first information associated with the SOP cell when the SOP cell advances to a stage i, and the table is accessed using second information associated with the SOP cell when the SOP cell subsequently advances to a stage j, wherein the access of the table when the SOP cell advances to the stage j usurps an access of the table relating to a cell assigned to a second slot of the packet processing pipeline advancing to the stage i.

10. The packet processing system of claim 9, wherein the scheduler assigns a non-SOP cell to the second slot.

11. The packet processing system of claim 9, wherein the second slot does not contain a valid cell.

12. The packet processing system of claim 9, wherein the table is accessed using third information associated with the SOP cell when the SOP cell subsequently advances to a stage k, wherein the access of the table when the SOP cell advances to the stage k usurps an access of the table relating to a cell assigned to a third slot of the packet processing pipeline advancing to the stage i.

13. The packet processing system of claim 9, wherein the packet processing pipeline is an ingress pipeline.

14. The packet processing system of claim 9, wherein the packet processing pipeline is an egress pipeline.

15. A method, comprising:
accessing by a processing core in a packet processing system a table from a memory of the packet processing system using first information associated with a start of packet (SOP) cell, which is assigned to a first slot of a packet processing pipeline, when the SOP cell advances to a stage i; and
accessing by the processing core the table using second information associated with the SOP cell when the SOP cell subsequently advances to a stage j, wherein the access of the table when the SOP cell advances to the stage j usurps an access of the table relating to a cell assigned to a second slot of the packet processing pipeline advancing to the stage i.

16. The method of claim 15, further comprising assigning a non-SOP cell to the second slot.

17. The method of claim 15, wherein the second slot does not contain a valid cell.

18. The method of claim 15, further comprising the processing core accessing the table using third information associated with the SOP cell when the SOP cell advances to a stage k, wherein the access of the table when the SOP cell advances to the stage k usurps an access of the table relating to a cell assigned to a third slot of the packet processing pipeline advancing to the stage i.

19. The method of claim 15, wherein the packet processing pipeline is an ingress pipeline.

20. The method of claim 15, wherein the packet processing pipeline is an egress pipeline.

* * * * *